United States Patent [19]
Abily et al.

[11] Patent Number: 6,029,233
[45] Date of Patent: Feb. 22, 2000

[54] CIRCUIT FOR MOVING DATA BETWEEN REMOTE MEMORIES AND COMPUTER COMPRISING SUCH A CIRCUIT

[75] Inventors: Jack Abily, Plaisir; Jean-François Autechaud, Paris; Christophe Dionet, Ivry-sur-Seine, all of France

[73] Assignee: Bull, S.A., Louveciennes, France

[21] Appl. No.: 08/867,410

[22] Filed: Jun. 2, 1997

[30] Foreign Application Priority Data

Jun. 10, 1996 [FR] France .................................. 96 07163

[51] Int. Cl.[7] .............................. G06F 12/06; G06F 13/14
[52] U.S. Cl. .............................. 711/165; 711/2; 711/167; 711/169
[58] Field of Search ................................ 711/2, 167, 165, 711/169, 154; 395/200.42; 709/212

[56] References Cited

U.S. PATENT DOCUMENTS

| | | | |
|---|---|---|---|
| 5,432,923 | 7/1995 | Taniguchi et al. | 711/2 |
| 5,469,558 | 11/1995 | Lieberman et al. | 395/285 |
| 5,617,529 | 4/1997 | Dao | 345/515 |
| 5,734,857 | 3/1998 | Gaubatz | 711/2 |
| 5,761,735 | 6/1998 | Huon et al. | 711/167 |

*Primary Examiner*—John W. Cabeca
*Assistant Examiner*—Christopher S. Chow
*Attorney, Agent, or Firm*—Kerkam, Stowell, Kondracki & Clarke, P.C.; Edward J. Kondracki

[57] ABSTRACT

Electrical circuit (5) arranged to move data blocks from a source memory unit (8, 9, 12) to a target memory unit (9, 12, 8) by a data path (5, 6, 7), to send, in a given order, requests to read blocks in the source memory, to generate an end marker in the request to read the last block of the source memory, to receive the blocks read, in the form of response messages, in the order in which the requests were sent, and to send requests to write the received blocks, in the target memory, during receiving of response messages until receiving a message from the source memory with the end marker.

15 Claims, 6 Drawing Sheets

CIRCUIT FOR MOVING DATA BETWEEN REMOTE MEMORIES AND COMPUTER COMPRISING SUCH A CIRCUIT

CROSS REFERENCE TO RELATED APPLICATION

The subject matter of this application is related to U.S. application Ser. No. 08/867,404 in the names of Jack ABILY and Jean-Yujun QIAN filed concurrently herewith and corresponding to French application 96 07162 filed Jun. 10, 1996.

FIELD OF THE INVENTION

The field of the invention is that of the data transfer (move) between remote memories in data processing systems.

DESCRIPTION OF RELATED ART

At present, the constant reduction in the price of binary memory allows for considerable increases in capacity. However, an increase in capacity runs the risk of correlatively increasing a certain inertia in the operation of the memory. For this reason, it is known to use a main memory unit whose size, while substantial, allows rapid access, and one or more expanded memories whose contents are viewed through the main memory unit using virtual addressing. Only the data effectively used by the system is physically resident in the main memory unit. To carry out operations on data that is physically resident in an expanded memory unit, the system transfers (moves) this data to the main memory unit. To make room in the main memory unit, the system also moves data to the expanded memory unit.

The distance between an expanded memory unit and the main memory unit inevitably results in a certain latency between the beginning and the end of a move. Ordinarily, a memory unit is subdivided into pages, which are themselves constituted by data blocks. In order not to adversely affect the performance of the system with moves that are too rapid, it is preferable to execute moves by blocks, or even by pages.

It is possible to send a request to read a number of blocks in the source memory which are accessible using a single read request, by addressing the first block of the request and counting down the total number of blocks to be read. As soon as the response to the request is received, a request to write in the target memory is then sent, by addressing the first block of the request and by counting down the total number of blocks to be written in order to send new write requests until the total number of blocks to be written is exhausted. The preceding operations are repeated in order to send new requests until the total number of blocks to be read is exhausted. However, when the source memory is remote from the target memory, there is a certain latency between the sending of the request and the reception of the response. This method has the drawback of passing along an accumulation of the latencies which occur successively throughout the move.

It is possible to send all of the read requests without waiting for the responses by storing the read requests so that write requests are sent upon reception of the responses corresponding to each read request. This solution has the drawback of requiring an intermediate storage operation, the execution of which runs the risk of slowing down the transfers. This solution also has another problem. The interruption of a move by an error detection function or by another, higher-priority move requires a specific storage operation, the management of which can be complex.

SUMMARY OF THE INVENTION

The object of the invention is to reduce to a minimum the latency between the beginning and the end of a move by means of minimal intermediate storage. This is achieved through the use of an electrical circuit for moving data blocks from a source memory unit to a target memory unit by means of a data path, characterized in that it comprises means for sending, in a given order, requests to read blocks in the source memory, comprising means for generating an end marker in the request to read the last block of the source memory, storage means for receiving the blocks read, in the form of response messages, in the order in which the requests were sent, means for sending requests to write, in the target memory, the blocks received by the storage means as the response messages are received.

BRIEF DESCRIPTION OF THE DRAWINGS

The invention will be more clearly understood with the aid of the following description in reference to the figures wherein like elements throughout the several views are identified with like reference characters.

DESCRIPTION OF THE PREFERRED EMBODIMENTS

Figure 1:
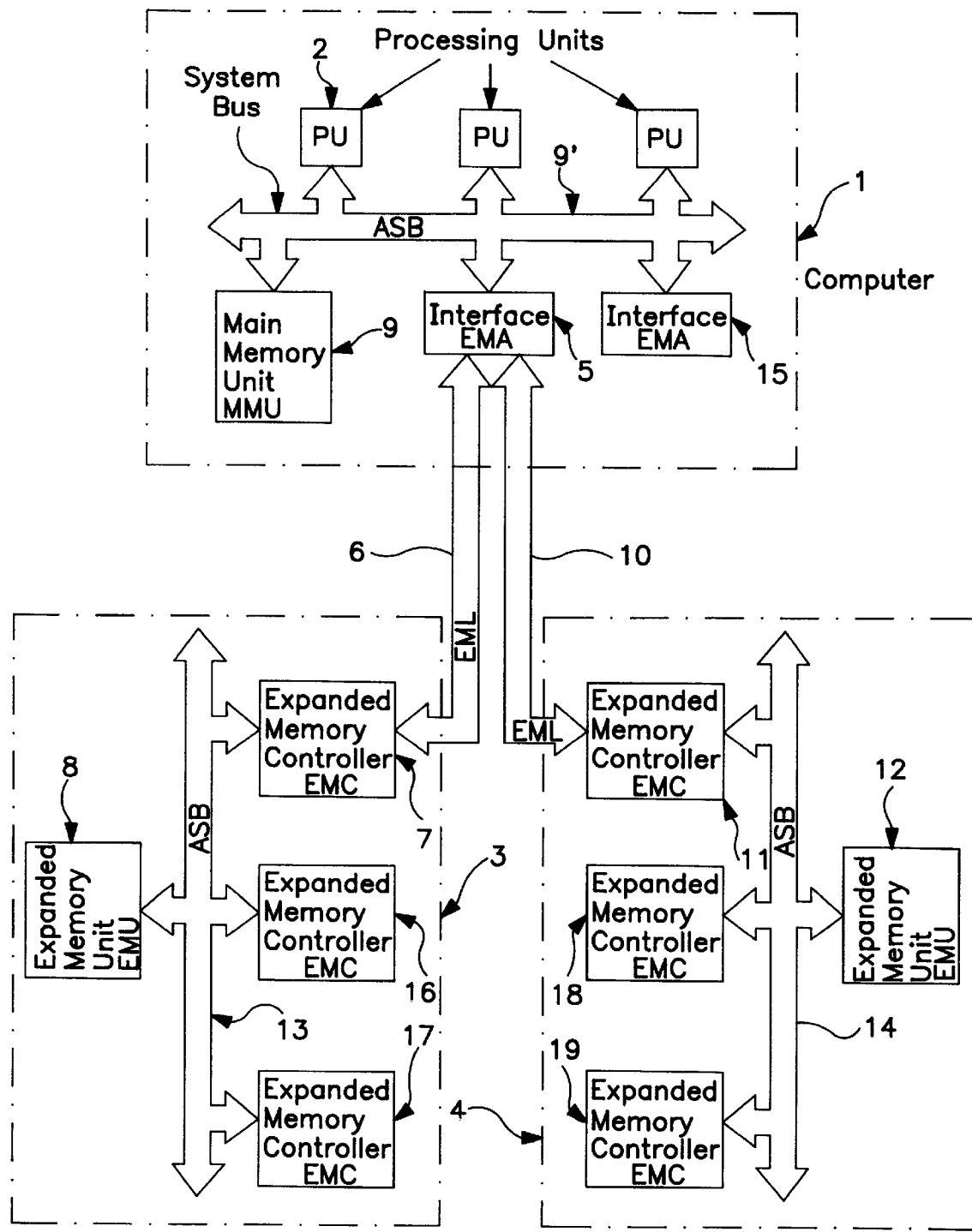
FIG. 1 represents a data processing system with a computer having access to at least one expanded memory unit according to the invention.

In FIG. 1, a computer 1, comprises a main memory unit MMU 9 which is accessed by at least one processing unit PU 2 through a system bus ASB 9'. One or more expanded memory access interfaces EMA are connected to the bus ASB 9'. The interface EMA 5 is linked to an expanded memory controller EMC 7 located in a cabinet 3 that is remote from the computer 1, by a link EML 6. A link EML can be a serial link or a parallel link which allows the high-speed transfer of information. The cabinet 3 comprises an expanded memory unit EMU 8 which is accessed by the expanded memory controller 7 through a system bus ASB 13. Other controllers EMC 16, 17, which are not limited to the quantity shown in the figure, can also be provided for accessing the expanded memory unit EMU 8 through the system bus 13. The controller 16, for example, makes it possible to exchange data with another computer not represented, in accordance with the same diagram as that shown for the computer 1. It is possible to arrange for the interface 5 to also be linked to an expanded memory controller EMC 11 located in a cabinet 4 by a link EML 10. Like the cabinet 3, the cabinet 4 comprises an expanded memory unit EMU 12 which is accessed by the expanded memory controller 11 through a system bus ASB 14. Other controllers EMC 18, 19, which are not limited to the quantity shown in the figure, can also be provided for accessing the expanded memory unit EMU 12 though the system bus 14. The controller 18, for example, makes it possible to exchange data with another computer not represented, in accordance with the same diagram as that shown for the computer 1. The expanded memory unit 12 can be used to backup or increase the capacity of the expanded memory unit 8. When used as a backup, the expanded memory unit EMU 12 allows redundancy of the data stored. When used to increase capacity, the expanded memory unit 12 makes it possible to have the use of a larger expanded memory.

The computer 1 in FIG. 1 has a second interface EMA 15, which is also connected to the system bus 9'. By connecting a first port of the interface EMA 15 to a second port of the controller EMC 16 and a second port of the interface 15 to a second port of the controller EMC 18, by means of links EML not represented in order to preserve the clarity of the figure, it is possible to obtain a redundancy of the connections of the computer 1 with the cabinets 3 and 4.

The expanded memory units EMU 8 and 12 are each subdivided into $2^j$ pages, the addresses of which are coded into j bits. Each page is in turn subdivided into $2^k$ data blocks, the addresses of which are coded into k bits. The width of the data path from the interface EMA 5 to the controller EMC 7 through the link EML 6 is $2^m$ bytes. A byte is for example an eight-bit or nine-bit byte. Thus $2^m$ bytes constitute a sub-block of a data block. Each data block contains $2^n$ sub-blocks, addressable at n bits within a block.

In the computer 1, a data move between the main memory unit MMU 9 and the expanded memory unit EMU 8 or the expanded memory unit EMU 12 occurs at the request of a processing unit PU of the computer 1. A processing unit PU of the computer 1 can also request a direct move between the expanded memory unit EMU 8 and the expanded memory unit EMU 12. For this purpose, the processing unit PU, upon the order of a process in progress in the unit PU, sends a move request to the interface EMA 5, indicating to it the source memory unit from which the data are to be extracted in blocks and the target memory unit into which the data are to be introduced in blocks. If the source memory unit is the main memory unit MMU 9, the target memory unit is the expanded memory unit EMU 8 or the expanded memory unit EMU 12. If the source memory unit is the expanded memory unit EMU 8 or EMU 12, respectively, the target memory unit is the main memory unit MMU 9 or the expanded memory unit EMU 12 or EMU 8, respectively. The process which originates the move also specifies in its request the address of the first sub-block in the source memory, the address of the first sub-block in the target memory where the move is to begin, and the quantity of sub-blocks to be moved. From that point on, the interface EMA 5 executes the move independently from the processing unit PU.

A process can request a synchronous move or an asynchronous move. In the case of a synchronous move, the process is interrupted and only restarts when the move has terminated. Therefore, a synchronous move needs to be fast. In the case of an asynchronous move, the process continues without waiting for the end of the move, which is executed independently. In order not to adversely affect a process which requests a synchronous move while an asynchronous move is in progress, a synchronous move request can interrupt, in the interface EMA, an asynchronous move in progress, which will restart at the end of the synchronous move. It is the interface EMA which manages the interruptions and restarts of the moves, in a way that is transparent to the processes executed by the processing unit PU.

Figure 2:
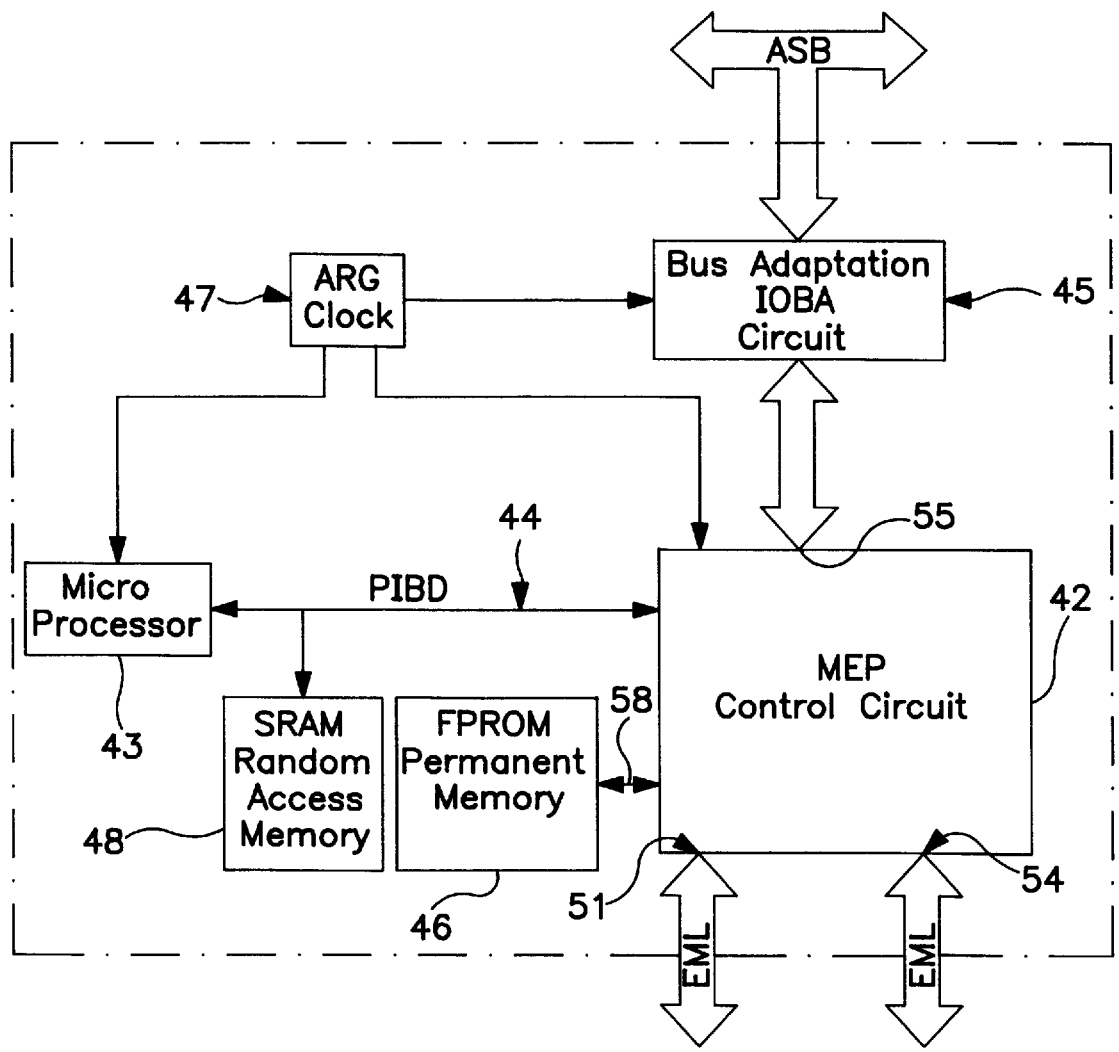
FIG. 2 represents one possible embodiment of the circuit of the invention in the system in FIG. 1.

An interface EMA or a memory controller EMC is embodied by a circuit 41, which is presented in greater detail in FIG. 2. The circuit 41 essentially comprises an integrated circuit MEP 42 detailed in FIG. 3, synchronized by a clock generator ARG 47 and controlled by a microprocessor 43. A permanent memory FPROM 46 contains microsoftware for operating the integrated circuit 42. A random access memory SRAM 48 is provided to contain the data which qualifies the moves handled by the circuit 41. At the initialization of the circuit 41, the integrated circuit 42 loads into the memory 48 the microsoftware contained in the memory 46. To do this, the circuit 42 directly accesses the memory 46 through a link 58. The memory 46 essentially guarantees the permanence of the information at initialization, while the memory 48 guarantees access performance during operation. If the read-write standards in the memories 46 and 48 are different, for example in one byte in the memory 46 and in eight bytes in the memory 48, the integrated circuit 42 performs the necessary byte groupings and generates the appropriate parity controls. A bus adaptation circuit IOBA 45 allows the circuit 41 to be adapted to the system bus ASB for data transfers between the bus ASB and the integrated circuit 42. The circuit 45 and the microprocessor 43 are synchronized by the clock generator 47. The microprocessor 43 exchanges and processes the data from the memory 48 and from the circuit 42 using a bus PIBD 44 and the microsoftware contained in the memory 48. The circuit 42 comprises one input-output port 55 linked to the adaptation circuit 45 and two input-output ports 51 and 54 connected by a link EML to a remote circuit identical to the circuit 41. A circuit 41 operating in interface EMA is connected to a circuit 41 operating in controller EMC. The width of the data path is identical in the ports 51, 54 and 55 and is equal to $2^m$ bytes. The advantage of the adaptor circuit 45 is that it can support an addressability that is different from the standard addressability in the ports 51, 54 and 55. For example, the addressing of the ports 51, 54 and 55 can be done in 40 bits, while the addressing of the main memory unit MMU can be done in 32 bits.

Figure 3:
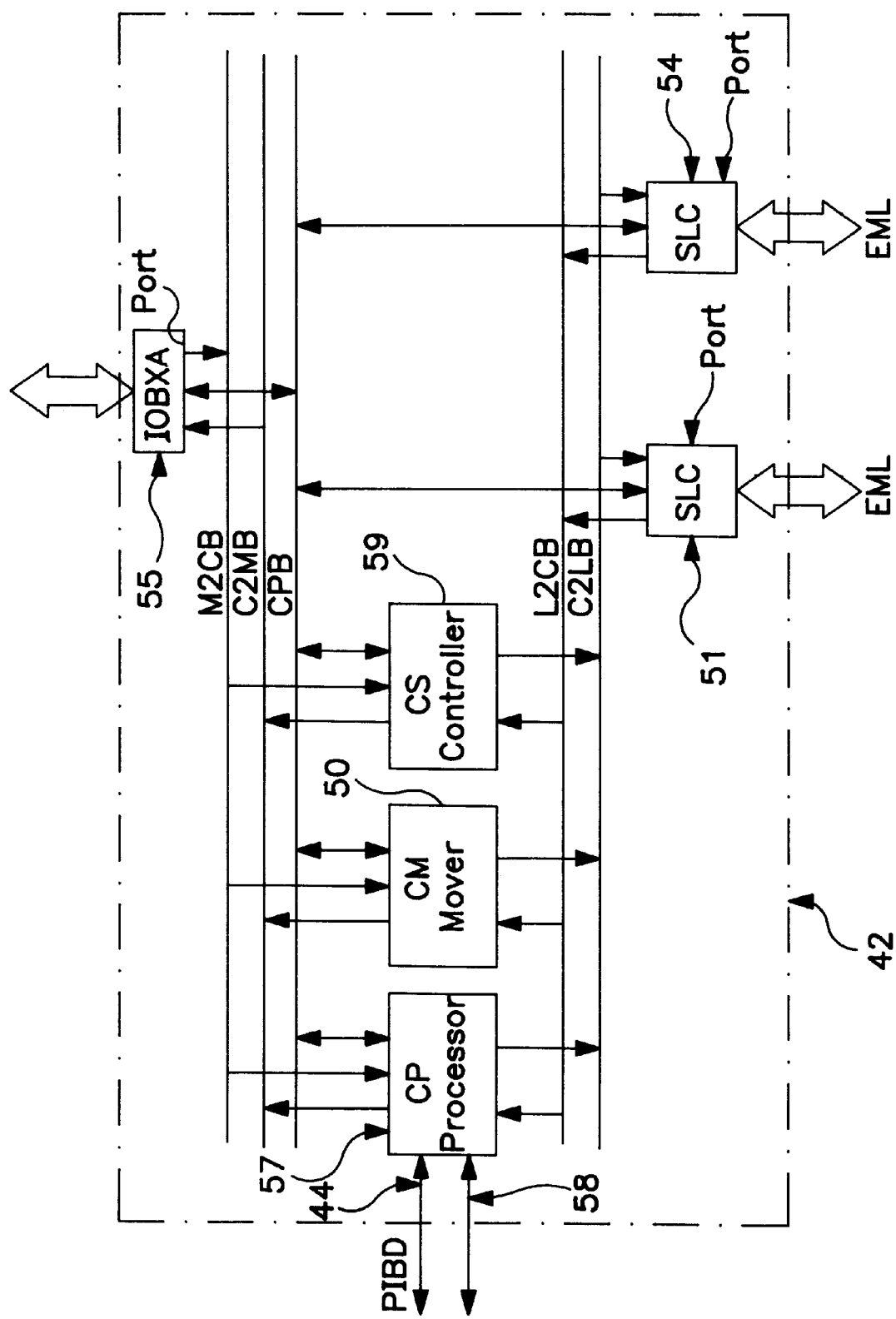
FIGS. 3 and 4 represent a first level of refinement of the architecture of the circuit according to the invention.

FIG. 3 shows the architecture of the integrated circuit 42. A processor element CP 57 allows the exchange of data for qualifying a move with the microprocessor 43 through the bus PIBD. The processor element 57 is linked directly to the memory 46 by the link 58, so that at initialization it loads into the memory 48 the microsoftware contained permanently in the memory 46. A mover element CM 50 is activated by the processor element 57 in cases where the integrated circuit 42 is mounted on a circuit 41 which takes the place of an interface EMA. A controller element CS 59 is activated by the processor element 57 in cases where the integrated circuit 42 is mounted on a circuit 41 which takes the place of a controller EMC.

The data exchanged with the memory located in the same cabinet in which the circuit 41 is installed passes through the port 55. If the circuit 41 is installed in the computer 1, the local memory is the main memory unit MMU; if the circuit 41 is installed in a cabinet 3 or 4, the local memory is the expanded memory unit EMU. A bus M2CB transfers the data from the port 55 to the processor element 57, to the transfer element CM 50 or to the controller element CS 59. A bus C2MB transfers the data from the processor element 57, from the transfer element CM 50 or from the controller element CS 59 to the port 55. The data exchanged with the remote memories pass through the ports 51 and 54. If the circuit 41 is installed in the computer 1, the remote memory is the expanded memory unit EMU of a cabinet 3 or 4; if the circuit 41 is mounted in a cabinet 3 or 4, the remote memory is the main memory unit MMU of a computer. A bus L2CB transfers the data from the port 51, 54 to the processor element 57, to the transfer element CM 50 or to the controller element CS 59. A bus C2LB transfers the data from the processor element 57, from the transfer element CM 50 or from the controller element CS 59 to the port 51, 54. A bidirectional bus CPB allows the processor element 57 to exchange data with the ports 51, 54, 55, with the transfer element 50 or with the controller element 59.

Figure 4:
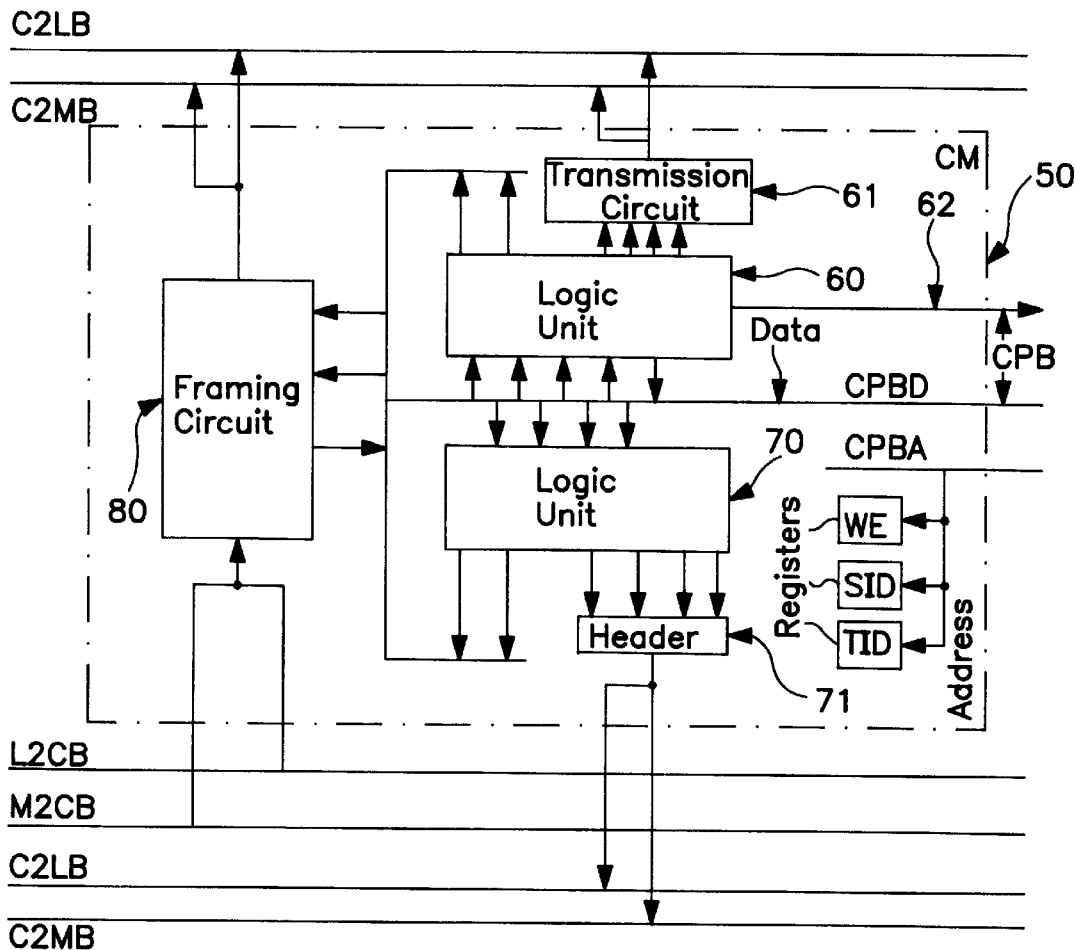

FIG. 4 represents the architecture of the transfer element or mover CM 50. Here again is the bus C2LB for sending requests to the expanded memory unit EMU, the bus C2MB for sending requests to the main memory unit MMU, the bus L2CB for receiving responses from the expanded memory unit EMU and the bus M2CB for receiving responses from the main memory unit MMU. The bus CPB is broken down into a data bus CPBD and an addressing bus CPBA.

The transfer element CM 50 is constituted by three main parts:

A logic unit 60 generates addresses in a destination memory located in the main memory unit MMU or in the expanded memory unit EMU. As will be seen in FIG. 5, the logic unit 60 comprises different internal registers for processing write requests directed to a page of $2^{k+n+m}$ bytes in the destination memory, through a message header transmission circuit 61. The main memory unit MMU and the expanded memory unit EMU do not necessarily have the same number of pages, and $2^k$ represents a different number depending on whether the destination memory is the main memory unit MMU or the expanded memory unit EMU. The circuit 61 sends through the bus C2LB if the destination memory is the expanded memory unit EMU and through the bus C2MB if the destination memory is the main memory unit MMU. In addition, the logic unit 60 is connected to the bus CPBD for exchanging the data in its internal registers with the microsoftware executed by the microprocessor 43. The logic unit 60 is also directly connected to the processor interface controller CP 57 for an exchange of interrupt signals with the microsoftware through a link 62.

A logic unit 70 generates addresses in a source memory located in the main memory unit MMU or in the expanded memory unit EMU. As will be seen in FIG. 6, the logic unit 70 comprises different internal registers for processing read requests directed to a page of $2^{k+n+m}$ bytes in the source memory, through a message header transmission circuit 71. The main memory unit MMU and the expanded memory unit EMU do not necessarily have the same number of pages, and $2^k$ represents a different number depending on whether the source memory is the main memory unit MMU or the expanded memory unit EMU. The circuit 71 sends through the bus C2LB if the source memory is the expanded memory unit EMU, and through the bus C2MB if the source memory is the main memory unit MMU. In addition, the logic unit 70 is connected to the bus CPBD for exchanging the data in its internal registers with the microsoftware executed by the microprocessor 43.

A framing circuit 80 transfers the data present in one of the busses L2CB or M2CB to the bus C2MB if the destination memory is the main memory unit MMU or to the bus C2LB if the destination memory is the expanded memory unit EMU. As will be seen in FIG. 7, the framing circuit comprises different internal registers, the contents of which are exchanged with the microsoftware through the bus CPBD.

The transfer element CM 50 also comprises three internal registers WE, SID and TID, which are write-accessible by the microsoftware through the bus CPBA. The register WE is intended to contain a permit to write in the destination memory. The two registers SID and TID are intended to contain the global information for a move process. The register SID contains two bits whose combination identifies the source memory. For example, the setting of the first bit to zero indicates that the source memory is the main memory unit MMU and the setting of the first bit to one indicates that the source memory is an expanded memory unit EMU; the second bit is available to indicate which expanded memory unit EMU is the source memory. The register TID contains the identification of the target 51, 54, 55 of the move. The register TID contains two bits whose combination identifies the destination memory. For example, the setting of the first bit to zero indicates that the destination memory is the main memory unit MMU and the setting of the first bit to one indicates that the destination memory is an expanded memory unit EMU; the second bit is available to indicate which expanded memory unit EMU is the destination memory. It is thus possible to make a move from the main memory unit MMU 9 to the expanded memory unit EMU 8 or the expanded memory unit EMU 12, and from the expanded memory unit EMU 8 or the expanded memory unit EMU 12 to the main memory unit MMU 9. It is also possible to make a move directly from the expanded memory unit EMU 8 to the expanded memory unit EMU 12 or from the expanded memory unit EMU 12 to the expanded memory unit EMU 8 without going through the main memory unit MMU.

Figure 5:
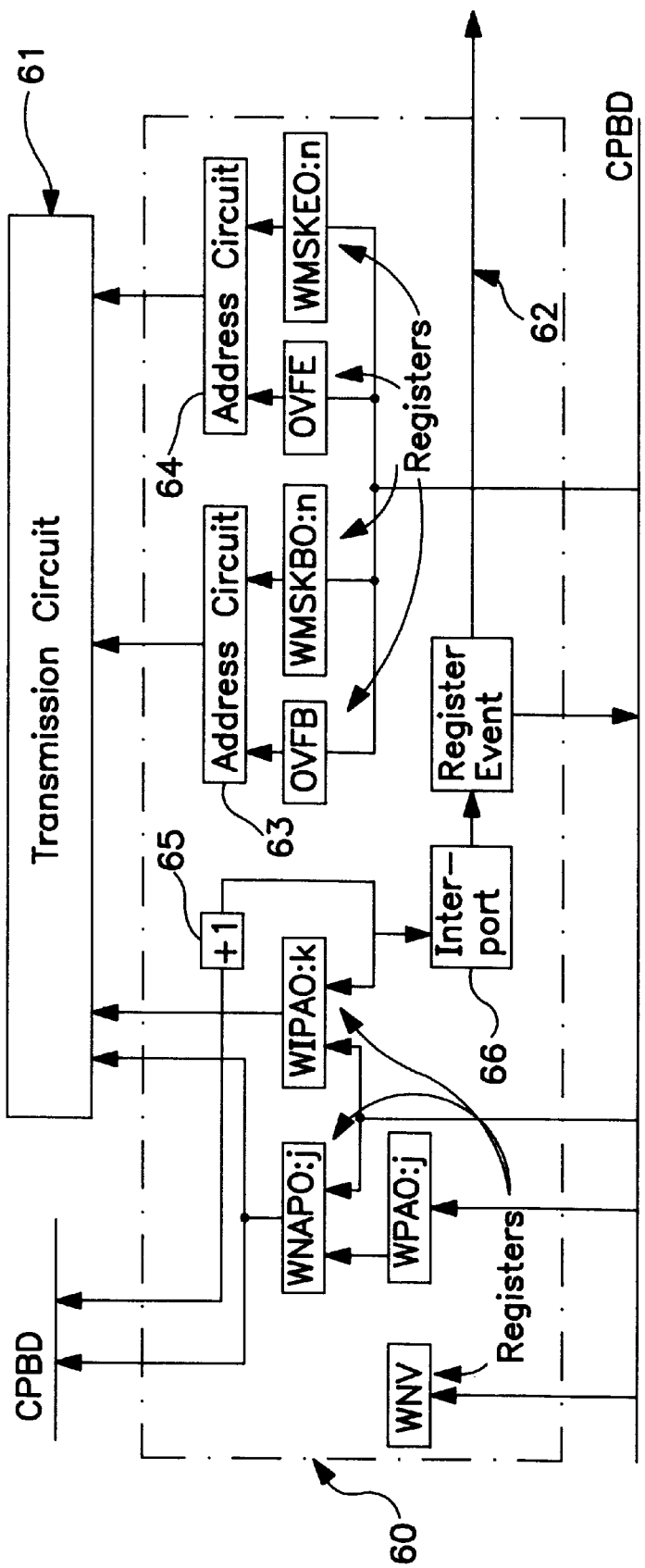
FIGS. 5 through 7 represent a second level of refinement of the architecture of the circuit according to the invention.

FIG. 5 represents the logical unit 60 in greater detail. In this figure, the registers intended to contain an address in the destination memory are indicated by a mnemonic abbreviation followed by the number of the first bit and by the usable length of the register, expressed in bits. The other registers are simply indicated by a mnemonic abbreviation.

Four registers OVFB, WMSKB, OVFE and WMSKE are write-accessible by the microsoftware through the bus CPBD. The register OVFB is intended to contain an indication for write access to the first block of the destination memory to receive the move. As seen above, a block is formed of $2^n$ sub-blocks. The register WMSKB is intended to contain a mask coded in n bits which specifies, in this first block, the sub-block of $2^m$ bytes in which the write operation begins. The register OVFE is intended to contain an indication for write access in the last block of the destination memory to receive the move. The register WMSKE is intended to contain a mask coded in n bits which specifies, in this last block, the sub-block of $2^m$ bytes in which the write operation ends. A circuit 63 is intended to transmit to the circuit 61 the address in the destination memory of the first sub-block which will be subject to a move. This address is generated using the contents of the registers OVFB and WMSKB. A circuit 64 is intended to transmit to the circuit 61 the address, in the destination memory, of the last sub-block which will be the object of a move. This address is generated using the contents of the registers OVFE and WMSKE.

Two registers WPA and WIPA are read- and write-accessible by the microsoftware through the bus CPBD. The register WPA is intended to contain the address, coded in j bits, of the page of the destination memory toward which the move is in progress. The register WIPA is intended to contain the address, coded in k bits, of the block toward which the move is in progress, in the page indicated by the contents of the register WPA. The contents of the registers WPA and WIPA will be transferred to the circuit 61.

Viewed from the circuit EMA 5, it is possible to perform write operations $W2^{n+m}B$ of $2^{n+m}$ bytes and partial write operations $PW2^{n+m}B$ in a complete block of the remote expanded memory unit EMU. Requests to write in complete blocks accelerate the data transfer rates. At the start of the write operation in the destination memory, if it is the expanded memory unit EMU, the register WIPA is incremented as explained in the next paragraph. The circuit EMA 5 allows possible write operations $W2^PB$ in a block of the local main memory unit MMU by sub-blocks of $2^P$ bytes, with partial write operations $PW2^PB$ by a sub-block of $2^P$ bytes, p having different values less than or equal to $2^{n+m}$. At the start of the write operation in the destination memory, if it is the main memory unit MMU, it may be necessary to perform a partial write operation $PW2^PB$ in a sub-block of $2^P$ bytes followed by write operations $W2^PB$ in a block of $2^{n+m}$ bytes before the write operation continues at the start-of-block of the destination memory. In this case, the content of the register WIPA remains frozen until the write operation continues at the start-of-block of the destination memory. As soon as the write operation continues at the beginning of the block of the destination memory, the register WIPA is incremented as explained in the next paragraph.

With each transfer of the content of the register WIPA to the circuit 61, the content of the register WIPA is incremented by one unit by means of a circuit 65, in order to access the next block within the same page. With each overflow of the register WIPA, a circuit 66 generates an interrupt in a register EVENT linked directly to the processor interface controller CP 57 by the link 62. The register EVENT makes it possible to store the source of an interrupt; it is read-accessible by the microsoftware through the bus CPBD.

Two registers WNV and WNPA are write-accessible by the microsoftware through the bus CPBD. The register WNPA is intended to contain the address, coded in j bits, of the page which follows the page toward which the move is in progress. The content of the register WNPA is intended to be loaded into the register WPA when the register WNV indicates that this content is valid and when the preceding page is finished.

Figure 6:
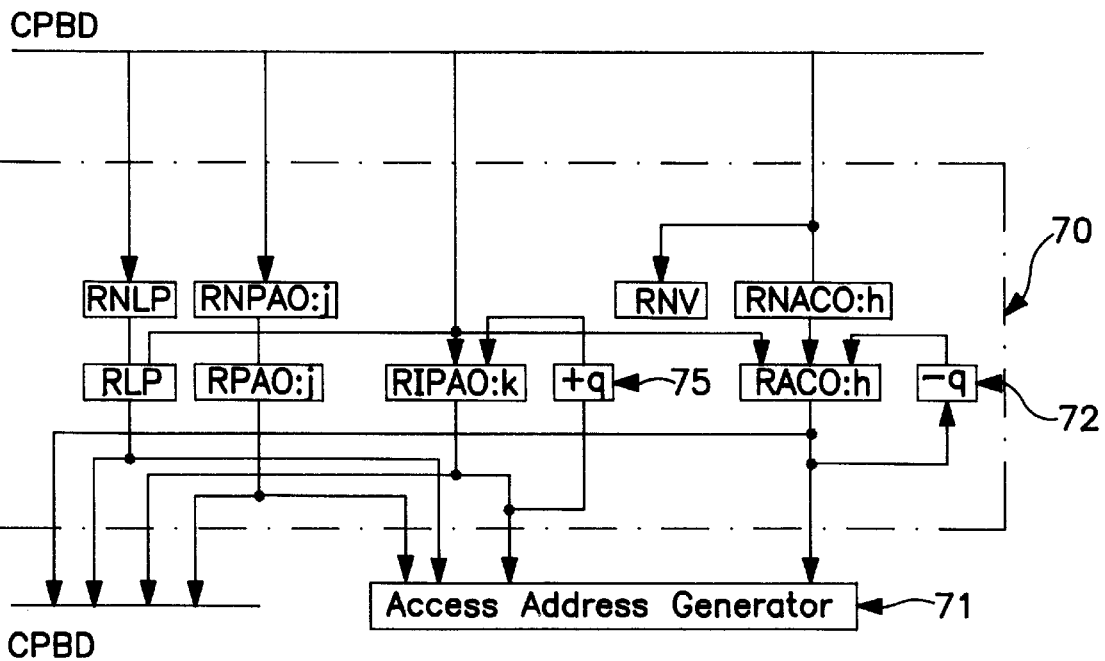

FIG. 6 represents the logical unit 70 in greater detail, using the same conventions as in FIG. 5.

Four registers RPA, RIPA, RAC and RLP are write-accessible by the microsoftware through the bus CPBD. The register RPA is intended to contain the address, coded in j bits, of the page of the source memory from which the move is being requested. The register RIPA is intended to contain the address, coded in k bits, of the block from which the move is being requested, in the page indicated by the content of the register RPA. The outputs of the registers RPA and RIPA are linked to the circuit 71 for generating the access addresses of the source memory. With each transfer of the content of the register RIPA to the circuit 71, the content of the register RIPA is incremented by a number q by means of a circuit 75. The register RAC is intended to contain the number of blocks, coded in h bits, which remain to be accessed in the page indicated by the content of the register RPA. Generally, h is equal to k+1, so it is possible to code the maximum number $2^k$ of blocks contained in one page. With each transfer of the content of the register RAC to the circuit 71, the content of the register RAC is decremented by the number q by means of a circuit 72. The number q represents a quantity of contiguous blocks accessible by a single read instruction. The register RLP is intended to contain a marker indicating whether the page indicated by the content of the register RPA is the last page to be accessed during a move. The registers RLP, RPA and RIPA are read-accessible by the microsoftware through the bus CPBD.

Four registers RNPA, RNAC, RNLP and RNV are write-accessible by the microsoftware through the bus CPBD. The register RNPA is intended to contain the address, coded in j bits, of the page of the source memory which follows the page from which the move is being requested. The register RNAC is intended to contain the number of blocks, coded in h bits, which remain to be accessed in the page indicated by the content of the register RNPA. The register RNLP is intended to contain a marker indicating whether the page indicated by the content of the register RNPA is the last page to be accessed during a move. The contents of each register RNPA, RNAC and RNLT, respectively, will be transferred to the register RPA, RAC and RLP if the content of the register RNV indicates that the contents of the registers RNPA, RNAC and RNLP are valid for transfer.

Figure 7:
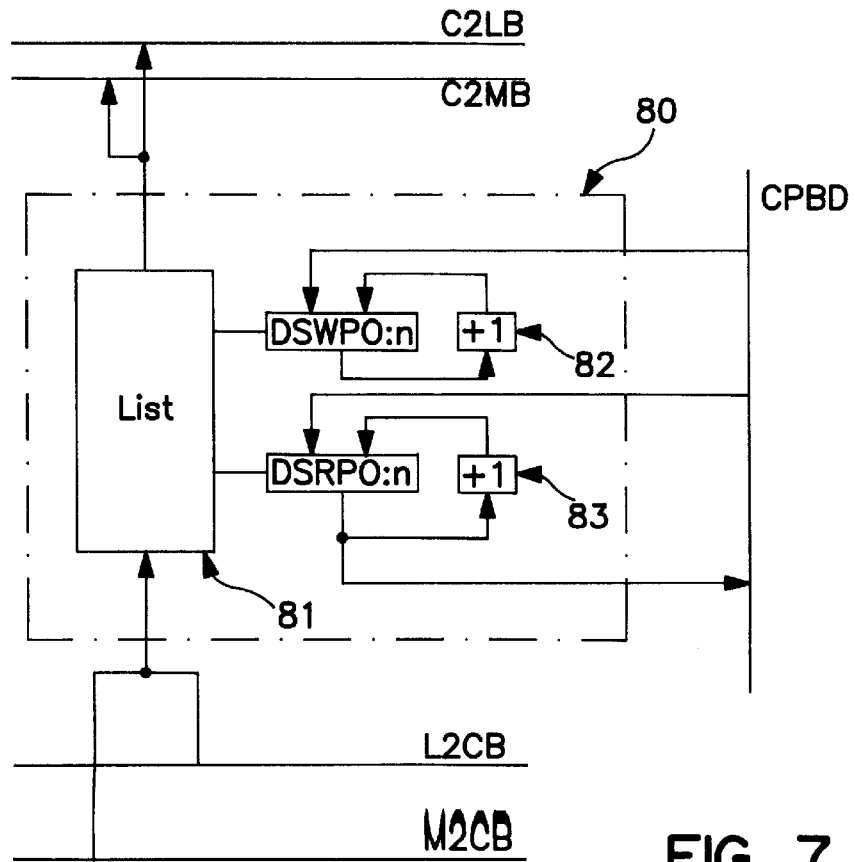

FIG. 7 represents the framing circuit 80 in greater detail A list 81 of the FIFO (First In First Out) type receives as input the data from the bus L2CB or from the bus M2CB and delivers its data as output to the bus C2MB or to the bus C2LB. The list 81 is constituted by $2^n$ elements, each of which contains a number of bits equal to the width of the data path in the busses C2LB, C2MB, L2CB and M2CB. Two registers DSWP and DSRP are write-accessible by the microsoftware through the bus CPBD. The register DSRP is intended to contain a pointer to an element of the list 81 so that it can be written through the bus C2LB if the destination memory is the expanded memory unit EMU, or written through the bus C2MB if the destination memory is the main memory unit MMU. The content of the register DSRP is incremented by one unit by means of a circuit 83, with each writing of an element in one of the busses C2LB or C2MB. The register DSWP is intended to contain a pointer to an element of the list 81 so that it can be read through the bus L2CB if the source memory is the expanded memory unit EMU, or read through the bus M2CB if the source memory is the main memory unit MMU. The content of the register DSWP is incremented by one unit by means of a circuit 82, with each reading of an element through one of the busses L2CB or M2CB. The register DSRP is read-accessible by the microsoftware through the bus CPBD.

The following description explains the operation of a move. A move is executed by the transfer element 50 at the request of a processor in the computer which contains the main memory unit MMU. For this purpose, the processor requesting the move sends the circuit 41, through the bus ASB, a stream of initialization data which qualifies the move. In the circuit 41, this initialization data is transmitted to the memory 48 via the bus M2CB, the processor interface controller CP 57 and the bus PID. Using the microsoftware resident in the memory 48, the microprocessor controls the move from this data.

Appendices 1 and 2 give an example of this microsoftware's sequences for initializing the contents of the registers described above, at the start of a move. To make them easier to understand, the values of the registers, which are indicated in capital letters in the figures, are indicated identically in lower case letters in the instruction lines.

Appendix 1 describes the initialization for read accesses of the first page of the source memory and write accesses of the first page of the destination memory.

Lines 1 through 4 store, in the register TID, the value 00 or 01 for a move from a remote expanded memory unit EMU labelled 0 or 1, or the value 1x for a move from the local main memory unit MMU.

Line 5 stores, in the register SID, the identifier of the port linked to the source memory, for example 00 for the port 55, 10 for the port 51 and 11 for the port 54.

Line 6 inhibits the transmission of write access to the destination memory by setting the contents of the register WE to zero.

Lines 7 through 16 initialize read accesses to the page of the source memory in which the move begins.

The expanded memory unit EMU and the main memory unit MMU are divided into pages. Each page is in turn divided into $2^k$ blocks of $2^n$ sub-blocks each. Each sub-block comprises $2^m$ bytes. Thus, in a memory containing no more than $2^j$ pages, the address of each byte is coded in j+k+n+m bits.

Three values appear in the initialization data:

rad[{i }0:j+k+n+m] represents a start address of the $i^{th}$ source memory page, coded beginning with the bit 0 with a length of j+k+n+m bits; using the same write convention, it is possible to extract from this datum, for example rad[{0}j+k:n] which represents the address of the first transferred sub-block in the page;

wad[{i}0:j+k+n+m] represents a start address of the $i^{th}$ destination memory page, coded beginning with the bit 0 with a length of j+k+n+m bits;

a number lgthxmB, which represents a move length in units of sub-blocks of $2^m$ bytes.

Line 7 of the microsoftware calculates the length of a move in blocks of $2^{n+m}$ bytes. The basis of the formula used is explained as follows. To accelerate the move, the extraction from the source memory is executed in blocks of $2^{n+m}$ bytes. A number lgthxn of blocks of $2^{n+m}$ bytes read-accessed in the source memory is calculated from the number lgthxmB. A move begins at any sub-block within a block. The first block to be extracted from the source memory thus comprises a number x of sub-blocks, given by the formula:

$$x = 2^n - \text{rad}[\{0\}j{:}n]$$

The whole division by $2^n$ of the number (lgthxmB−x) provides a number y of whole blocks to be moved:

$$y = (lgthxmB - x)/2^n$$

If the remainder of the whole division is a non-null number z, it is necessary to extract an additional block from the source memory in order to move the remaining z sub-blocks. The number z being between 0 and $2^n - 1$, the whole division of $(z + 2^n - 1)$ by $2^n$ provides a quantity q of additional blocks (at least equal to the unit):

$$q = (z + 2^n - 1)/2^n$$

Finally, the number lgthxn of blocks to be extracted from the source memory is given by the formula:

$$lgthxn = 1 + y + q = 1 + (2^n y + a + 2^n - 1)/2^n$$

Where: $z = lgthxmB - x - 2^n y$
Therefore: $lgthxn = 1 + (lgthxmB + \text{rad}[\{0\}j{:}k{:}n] - 1)/2^n$ Line 8 stores, in the j bits of the register RPA, the address of the first page of the source memory in which the move begins.

Line 9 stores, in the k bits of the register RIPA, the address of the first sub-block of the source memory in which the move begins.

Lines 10 through 16 make it possible to store, in the register RAC, the number of blocks to be extracted from the first page accessed in the source memory, coded in (k+1) bits, and in the register RLP, a value indicating whether or not the first page accessed is the last. If the number lgthxn of blocks to be extracted from the source memory is greater than or equal to the number of blocks contained between the address of the first block to be extracted and the maximum content of a page counted in blocks, it is necessary to access subsequent pages in order to extract all of the blocks from the source memory. A value, for example 0, is stored in the register RLP to indicate that the first page accessed is not the last. The number of blocks contained between the address of the first block to be extracted and the maximum content of a page is stored in the register RAC. The number of remaining blocks to be extracted after the first page is considered to be a new number lgthxn of blocks to be extracted from the source memory. If the number lgthxn of blocks to be extracted from the source memory is less than the number of blocks contained between the address of the first block to be extracted and the maximum content of a page counted in blocks, it is not necessary to access subsequent pages in order to extract all of the blocks from the source memory. A value, for example 1, is stored in the register RLP to indicate that the first page accessed is the last. The first page accessed contains all of the blocks quantified by the number lgthxn of blocks to be extracted from the source memory, and the number lgthxn is stored in the register RAC. A content of the register RAC different from zero causes the generation of a read access in the source memory.

Lines 17 through 27 initialize write accesses in the first page of the destination memory in which the move begins.

Line 17 stores the address wad[{0}0:j] of the first page accessed in the current page address register WPA in the destination memory.

Line 18 stores the address wad[{0}j:k] of the first block accessed in the address register WIPA in a current page in the destination memory.

Line 19 stores the address wad[{0}j+k:n] of the first sub-block accessed in the first block, in the begin write mask register WMSKB in the destination memory.

Line 20 stores the address (wad[{0}j+k:n]+lgthmB−1) modulo $2^n$ of the last sub-block accessed in the last block, in the end write mask register WMSKE in the destination memory.

Line 21 calculates the difference between the address wad[{0}j+k:n] of the first sub-block write-accessed in the first block and the address rad[{0}j+k:n] of the first sub-block read-accessed in the first block. This difference represents the deviation in the alignment of the first block moved between the place where the first sub-block will be written into the first block of the destination memory and the place where the first sub-block will be read in the first block of the source memory. This difference modulo $2^n$ is stored in the register DSWP. If, in the moved block, the location of the first block written precedes that of the first sub-block read, the calculation of the difference causes an overflow which indicates that the reading of the first block in the source memory is not enough to end the writing of the first block in the destination memory.

Line 22 stores in the register OVFB an indication of an overflow in the calculation resulting from line 21.

Line 23 calculates the difference between the address of the last sub-block to be written into the destination memory and the deviation calculated in line 21. On line 7, the number lgthxn of blocks to be read in the source memory is calculated in order to update the target memory. If the deviation calculated in line 21 is greater than the address of the last sub-block, the calculation of the difference causes an overflow stored in the register OVFE. This allows the combinational hardware of the circuit 60 to take into account the fact that the last block received from the source memory overlaps two blocks of the target memory.

Lines 24 through 27 make it possible to store, in the register DSRP, the read pointer in the list 81. If the destination memory is the local main memory unit MMU, the register DSRP is initialized with the value contained in the register WMSKB. This makes it possible to begin the writing of the first sub-block at the appropriate address in a block of the destination memory using write instructions $W2^p b$ and if need be a first partial write instruction $PW2^p B$. If the destination memory is the remote expanded memory unit EMU, the register DSRP is initialized with a null value since the writing of the first sub-block at the appropriate address in a block of the destination memory can be done directly throughout the block, using a partial write operation $PW2^{n+m}B$.

Line 28 sets the register WE to 1 in order to validate the transmission of write access to the destination memory, which will occur as the responses from the source memory are received.

Appendix 2 describes the initialization, if necessary, for read accesses of the next page of the source memory and write accesses of the next page of the destination memory.

Line 1 stores, in the j bits of the register RNPA, the address of the second page of the source memory in which the move will continue.

Lines 2 through 8 repeat lines 10 through 16 of Appendix 1, applying them to the next page, while taking into account that the first sub-block has been written at the start of the page.

Line 9 validates the contents of the registers RNLP, RNPA, and RNAC after the execution of lines 1 through 8.

Line 10 stores the address wad[{1}0:j] of the second page accessed in the address register WNPA of the next page in the destination memory.

Line 11 validates the content of the register WNPA after the execution of line 10.

The following is an explanation of how a move is executed after the initialization phase. The contents of the registers RLP, RPA, RIPA and RAC are transferred to the circuit 71. The circuit 71 generates, from the contents of the registers RPA and RIPA, a request to read q blocks in the source memory. With each transfer of the contents of the registers, the content of the register RAC is incremented by q by means of the circuit 75 and the content of the register RAC is decremented by the same value q. Then the preceding operations are repeated until the content of the register RAC becomes null. When the content of the register RAC becomes null, if the content of the register RLP indicates a last page, the circuit 71 raises one bit LMOS in the request to indicate the end of a move. If the content of the register RLP does not indicate a last page, a valid content of the register RNV causes the transfer of the registers RNLP, RNPA and RNAC, respectively, into the registers RLP, RPA and RAC, and the content of the register RNV is invalidated. The microsoftware reloads the registers RNLP, RNPA, RNAC and RNV. The operations described above repeat until the end of the move indicated by the raising of the bit LMOS which constitutes an end-of-move marker.

The read requests are sent in the form of messages to the main memory unit MMU through the bus C2MB and the interface IOBXA if the source memory is the main memory unit MMU, or to the expanded memory unit EMU through the bus C2LB and the appropriate interface SLC if the source memory is the expanded memory unit EMU. For each read request, the source memory sends the circuit 42 a response message or several response messages. Each response message contains a data block that has been read. The circuit 42 receives a response to a request with a latency which depends on the length of the links and of the processing in the source memory. The order of the request messages is preserved for the response messages. If a request message calls for q blocks to be read, q response messages return in the order of the q blocks within the request message. The order is preserved because the intermediate registers, throughout the passage of the requests and the subsequent responses, are the first-in-first-out type.

Upon reception of the first response message, the first data block of the message is transmitted to the framing circuit 80 by writing the first sub-block of this block in the element of the list 81 indicated by the content of the register DSWP loaded during initialization. The content of the register DSWP is then incremented with each writing of a sub-block by means of the circuit 82, in order to write, sub-block by sub-block, the entire block received, that is until the content of the register DSWP again reaches its initial value. At this moment, the circuit 61 generates a write request in the destination memory using the contents of the registers WPA, WIPA, OVFB, WMSKB, OVFE and WMSKE as loaded during initialization. In fact, the write overlap begins as soon as possible. The first block to be written in the destination memory is stored in this message in the framing circuit 80. For this purpose, the first sub-block extracted from the list 81 is the one contained in the element indicated by the content of the register DSRP loaded during initialization. With each reading of a sub-block of the list 81, the content of the register DSRP is incremented by the circuit 83 in order to read the next sub-block.

Except perhaps at the beginning of the move, as explained above, each utilization of the contents of the register WIPA by the circuit 61 causes an incrementation of the register WIPA by the circuit 65 for the purpose of writing the next block in the destination memory.

When the content of the register DSRP becomes null, the next block received from the source memory is written in the list 81 beginning with the element indicated by the content of the register DSWP. The circuit 61 generates a write request in the destination memory using the contents of the registers WPA, WIPA, OVFB, WMSKB, OVFE and WMSKE. Each incrementation of the register DSWP authorizes the reading of an element of the list 81 indicated by the content of the register DSRP, which continues to be incremented in order to store a complete block in the write request message in the destination memory. The framing circuit therefore behaves like a shift register, each element of which has a capacity equal to the width of the data path, thus allowing the transfer to the source memory of all the blocks of a response message, correctly framed in the destination memory. With the incrementation of the register WIPA, the nulling of its content indicates that the end of the current page has been reached. The content of the register WPA is reloaded with the content of the register WNPA validated by the register WNV. The register WNV is invalidated. The nulling of the content of the register WIPA simultaneously causes an interrupt by the circuit 61, stored in the register EVENT and transmitted to the microprocessor 42 in order to reload the registers WNV and WNPA if necessary.

The process described in the preceding paragraph continues until the end of the reception by the circuit 42 of the last response message from the source memory, indicated as such by the end marker indicated by the bit LMOS, which the source memory systematically retransmits in its responses to the requests received.

It must be noted that the register WIPA in the circuit 60 plays a role identical to that of the register RIPA in the circuit 70. However, the circuit 60 does not need to use a counter like the register RAC in the circuit 70. The writing of the blocks in the destination memory occurs as the blocks arrive in the framing circuit 80. In addition, the anticipatory registers RNPA and WNPA, respectively, allow the read operation in the pages of the source memory, and the write operation in the pages of the destination memory, which are not necessarily contiguous. It is also noted that the requests and the responses are independent. In effect, nothing prevents the circuits 70 and 71 from sending read requests to the source memory while the circuits 60 and 61 send write requests to the destination memory which result from responses to prior remote read requests. In the circuit 42, the input of the read responses is synchronous with the output of the write requests in that the data blocks moved are transmitted to the destination memory through the framing circuit 80 as soon as they are received from the source memory. No additional latency is introduced at this level.

A move may be interrupted for various reasons. The reason could be, for example, a detection of a read or write error. It could also be an interrupt caused by a process in progress in the computer in order to execute a higher-priority move. An asynchronous move of the input-output type makes it possible to transfer a large number of data without preventing the process which initiated it from continuing. On the other hand, a synchronous move of the instruction type does not allow the process which initiated it to execute a subsequent instruction until the move has terminated. Synchronous moves are generally faster than asynchronous moves, since they transfer a limited number of data. In order not to interrupt a process initiating a synchronous move for too long, it is preferable to give a synchronous move priority over an asynchronous move.

If the circuit 50 detects an error, it causes a pause according to the sequence explained in the next paragraph. If a process in progress in the computer requests a priority move, it notifies the microprocessor of this via the port 55, the bus CPB, the processor element CP57 and the bus PID. If the microprocessor 43 detects that the move requested has a higher priority than the move in progress, it sends a pause instruction to the circuit 50 via the bus CPBA. The circuit 50 then causes a pause according to the sequence explained in the next paragraph.

Upon the next request from the process in progress, the circuit 71 sends the end marker by raising the bit LMOS to one. The register RNV invalidates the transfer from the registers RLP, RPA, RIPA and RAC to the circuit 71 in order to inhibit the sending of new read requests to the source memory. The contents of the registers RLP, RPA, RIPA and RAC are backed up in the memory 48 by the microprocessor 43 through the bus CPBD. A "suspended" state is detected by the reception of a response message from the source memory which contains the end marker, if the contents of the registers RAC, RLP, RNAC, RNLP are not null.

It the "suspended" state was caused by an error detection, the microprocessor 43 determines the page of the source memory or the destination memory in which the error occurred, by reading the contents of the registers. The microprocessor 43 then reveals the error, along with its location, to the process which initiated the move so that actions can be taken.

If the "suspended" state was caused by a request for a move with a higher priority than the move in progress, the microprocessor 43 loads the registers of the circuit 50 with the data of the higher-priority move. When the higher-priority move terminated, as detected by the end marker, the microprocessor can resume the suspended move by loading the registers of the circuit 50 with the backed-up data. The interruption of a move in progress is therefore transparent to the process which initiated While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

APPENDIX 1 if the destination memory is the main memory unit MMU
    tid := 1x;
if not
    tid := 0x;
sid := "identifier of the port 51,54,55 linked to the source memory";
we := 0
    lgthxn := 1 + (lgthxmB + rad[$\{0\}$j+k:n]$-$1)/$2^n$
rpa 0:j := rad[$\{0\}$0:j];
ripa 0:k := rad[$\{0\}$j:k];
if (($2^n$ $-$ rad[$\{0\}$j:k]) <= lgthxn)
    rlp := 0;
    rac 0:k+1 := $2^n$ $-$ rad[$\{0\}$j:k];
    lgthxn := lgthxn $-$ ($2^n$ $-$ rad[$\{0\}$j:k]);
if not
    rlp := 1;
    rac 0:k+1 := lgthxn;
wpa0:j := wad[$\{0\}$0:j];
wipa0:k := wad[$\{0\}$j:k];
wmskb0:n := wad[$\{0\}$j+k:n];
wmske0:n := (wad[$\{0\}$j+k:n]+lgthmB$-$1) modulo $2^n$;
dswp 0:n := wad[$\{0\}$j+k:n] $-$ rad[$\{0\}$j+k:n];
ovfb := overflow(wad[$\{0\}$j+k:n] $-$ rad[$\{0\}$j+k:n]);
ovfe := overflow(wmske0:n $-$ dswp0:n);
if the destination memory is the remote memory unit
    dsrp0:n := 000;
if not
    dsrp0:n := wad[$\{0\}$j+k:n];
we := 1

APPENDIX 2 rnpa0:j := rnad[$\{i\}$0:28];
if ($2^n$ <= lgthxn)
    rnlp := 0;
    rnac0:h := $2^n$;
    lgthxn := lgthxn $-$ $2^n$;
if not
    rnlp := 1;
    rnac0:h := lgthxn;
rnv := 1;
wnpa0:j := wad[$\{i\}$0:j];
wnv := 1;
end;

We claim:

1. An electrical circuit (5) for moving data blocks from a source memory unit (8, 9, 12) to a target memory unit (9, 12, 8), by means of a data path (5, 6, 7), characterized in that the electrical circuit comprises first sending means (70, 71) for sending, in a given order, read requests to read blocks in the source memory unit, said first sending means including means (RLP, RAC)

for generating an end marker in a request to read the last block of the source memory unit, storage means (80) for receiving the blocks read, in the form of response messages, in the order in which the read requests were sent, and second sending means (60, 61) for sending write requests to write, in the target memory unit, the blocks received in the storage means (80) during receiving of response messages until a message from the source memory unit with the end marker is received.

2. The circuit according to claim 1, characterized in that the means for generating an end marker comprises a first register (RLP) for indicating whether a page of the source memory for which the read requests are intended is the last page of a move, a second register (RAC) for containing the number of blocks remaining to be read in the page of the source memory for which the read requests are intended, and a logic circuit (71) for sending the end marker when the contents of the second register (RAC) becomes null, while the first register (RLP) indicates that the page of the memory source for which the read requests are intended is the last page of a move.

3. The circuit according to claim 2, characterized in that the first sending means (70) comprises a third register (RNLP) for indicating whether the next page of the source memory for which the read requests are intended is the last page of a move, a fourth register (RNAC) for containing the number of blocks to be read in the next page of the source memory for which the read requests are intended, and a fifth register (RNV) for validating the transfer of the contents of the third and fourth registers (RNLP, RNAC), respectively, to the first and second registers (RLP, RAC) when the contents of the second register (RAC) become null.

4. The circuit according to claim 3, characterized in that the first sending means (70) comprises a sixth register (RPA) for containing the address of the page of the source memory for which the read requests are intended, a seventh register (RIPA) for containing the address, within said page of the source memory, of the block in which the read operation begins, and an eighth register (RNPA) for containing the address of the next page of the source memory for which the read requests are intended.

5. The circuit according to claim 2, characterized in that the second sending means (60) comprises a first address register (WPA) for containing the address of the page of the target memory for which the write requests are intended, a second address register (WIPA) for containing the address, within said page of the target memory, of the block in which the write operation begins.

6. The circuit according to claim 5, characterized in that the second sending means (60) further comprises a third address register (WNPA) for containing the address of the next page of the target memory for which the write requests are intended, a validating register (WNV) for validating the transfer of the content of the third address register (WNPA) to the first address register (WPA) at the overflow of the content of the second address register (WIPA).

7. A computer (1) comprising at least one processing unit (2) for initiating moves between a main memory unit (9) of the computer and at least one remote expanded target memory unit (8) by means of a data path (5, 6, 7) characterized in that said computer comprises at least one circuit (5) for moving data blocks from the main memory unit 9 to the target memory unit 8, first sending means (70,71) for sending, in a given order, requests to read blocks in a source memory, said sending means including means (RLP, RAC) for generating an end marker in the request to read a last block of the source memory, storage means (80) for receiving the blocks read, in the form of response messages, in the order in which the requests were sent, and second sending means (60, 61) for sending requests to write, in the target memory unit, the blocks received in the storage means (80) during receiving of response messages until a message from the source memory unit with the end marker is received.

8. A computer as set forth in claim 7 characterized in that the means for generating an end marker comprises a first register (RLP) for indicating whether a page of the source memory for which the read requests are intended is the last page of a move, a second register (RAC) for containing the number of blocks remaining to be read in the page of the source memory for which the read requests are intended, and a logic circuit (71) for sending the end marker when the contents of the second register (RAC) becomes null, while the first register (RLP) indicates that the page of the memory source for which the read requests are intended is the last page of a move.

9. A computer as set forth in claim 8 characterized in that the first sending means (70) comprises a third register (RNLP) for indicating whether the next page of the source memory for which the read requests are intended is the last page of a move, a fourth register (RNAC) for containing the number of blocks to be read in the next page of the source memory for which the read requests are intended, and a fifth register (RNV) for validating the transfer of the contents of the third and fourth registers (RNLP, RNAC), respectively, to the first and second registers (RLP, RAC) when the contents of the second register (RAC) become null.

10. A computer as set forth in claim 9 characterized in that the first sending means (70) comprises a sixth register (RPA) for containing the address of the page of the source memory for which the read requests are intended, a seventh register (RIPA) for containing the address, within said page of the source memory, of the block in which the read operation begins, and an eighth register (RNPA) for containing the address of the next page of the source memory for which the read requests are intended.

11. A computer as set forth in claim 7 characterized in that the second sending means (60) comprises a first address register (WPA) for containing the address of the page of the target memory for which the write requests are intended, a second address register (WIPA) for containing the address, within said page of the target memory, of the block in which the write operation begins.

12. A computer as set forth in claim 11 characterized in that the second sending means (60) further comprises a third address register (WNPA) for containing the address of the next page of the target memory for which the write requests are intended, a validating register (WNV) for validating the transfer of the content of the third address register (WNPA) to the first address register (WPA) at the overflow of the content of the second address register (WIPA).

13. A process for moving data from a source memory unit (8, 9, 12) to a target memory unit (9, 12, 8) by means of a data path (5, 6, 7) characterized in that it consists of sending, by a first sending means (70, 71), in a given order, requests to read blocks in the source memory unit, while generating an end marker in the request to read the last block of the source memory unit, receiving the blocks read, in the form of response messages, in the order in which the requests were sent, and sending, by a second sending means (60, 61), requests to write the received blocks in the target memory unit during receiving of response messages until a message from the source memory unit with the end marker is received.

14. The process according to claim 13, comprising generating the end marker when the page of the source memory for which the read requests are intended is the last page of a move, and the number of blocks remaining to be read in the page of the source memory for which the read requests are intended is null.

15. The process according to claim 13, comprising placing the process in a "suspended" state by generating the end marker with the next read request when there is a request to pause the move, and backing up the contents of the registers so as to allow for the "suspended" state of the process.

* * * * *